Feb. 7, 1950   A. W. DOUX   2,496,908
SERVING DEVICE
Filed April 20, 1949
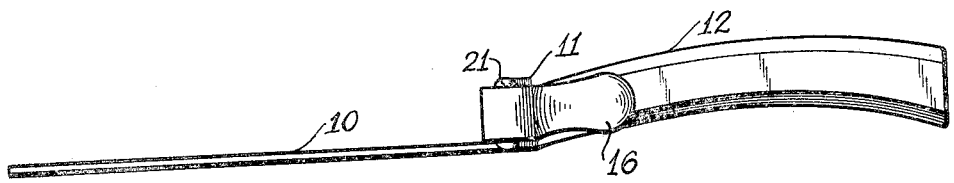
Fig. 1
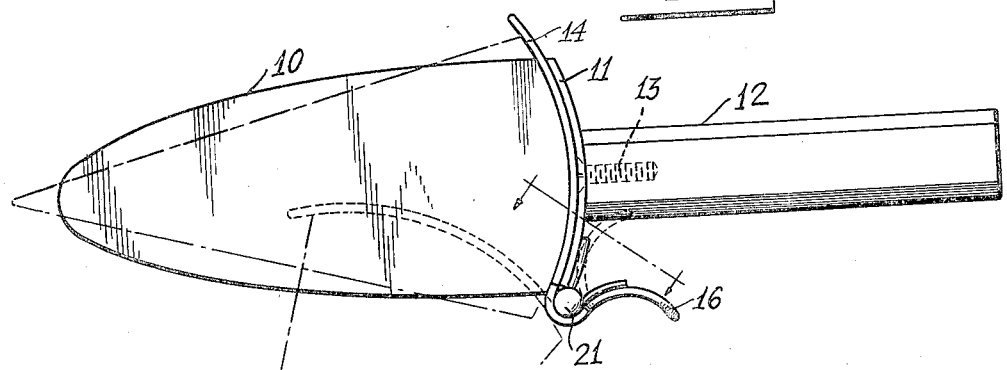
Fig. 2
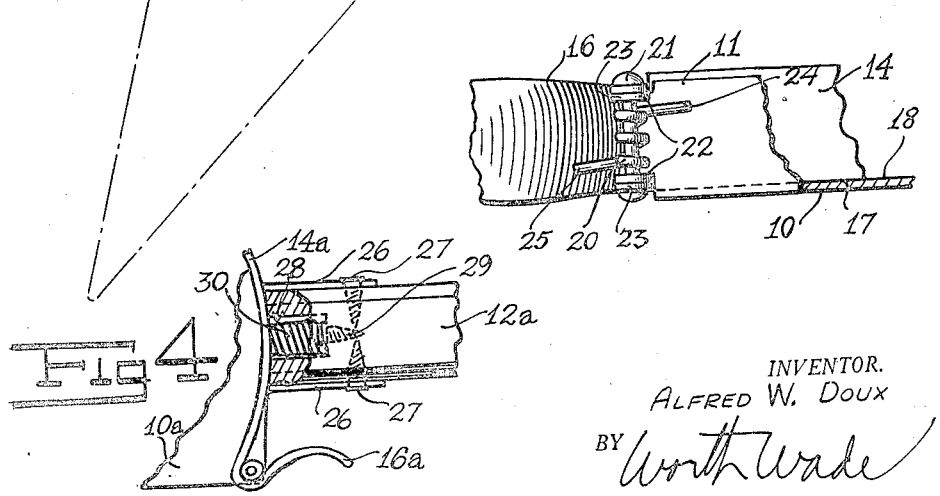
Fig. 3
Fig. 4
INVENTOR.
ALFRED W. DOUX
BY *Worth Wade*
ATTORNEY Patented Feb. 7, 1950

2,496,908

UNITED STATES PATENT OFFICE 2,496,908

SERVING DEVICE

Alfred W. Doux, New York, N. Y.

Application April 20, 1949, Serial No. 88,529

1 Claim. (Cl. 294—1)

This invention relates to household utensils and in particular to a device for serving cake, pie and the like.

Conventional devices for serving cake, pie and the like normally comprise a large two-edged curved knife blade fitted with a handle. Whether the cake or pie is cut with the blade or with a separate knife, the serving device is always used to lift the slice from the whole cake or pie and for dispensing it onto a plate. Most cakes are composed of sticky materials so that it is difficult to slide the slice off the blade. Pie slices are friable and tend to disintegrate when handled. It is customary with prior cake and pie servers to use a separate knife or a fork to push the slice off the serving blade but this operation requires two hands. Since it is desirable on occasions to use one hand for holding the plate on which the whole cake or pie rests and to attempt to serve the slices therefrom with the other hand, it is a general object of the present invention to provide a device for lifting and dispensing slices of cake, pie and the like which requires the use of only one hand for all these operations.

A specific object is a lifting and dispensing device for serving slices of cake, pie and the like which is provided with an automatic dispensing means for forcing the slice from the blade.

According to this invention there is provided a device for lifting and serving slices of cake, pie and the like comprising a flat blade, a stop extending upwardly and transversely at the base of the blade, a handle attached to the base of the blade, a lever pivotally mounted at one side edge of the blade adjacent the base and adapted to sweep across the blade and scrape the upper surface thereof, and a spring arranged to hold the lever against the stop.

Referring to the accompanying drawing,

Fig. 1 is a side elevation of one embodiment of the utensil;

Fig. 2 is a top plan view of the utensil of Fig. 1;

Fig. 3 is a front elevation, partly in section of the utensil of Fig. 2 taken along the line 3—3 thereof.

Fig. 4 is a detailed elevation, partly in section, of the spring-loaded dispensing lever and back stop.

In the preferred embodiment, the device comprises, in combination, an elongate two-edged flat blade 10 having a portion at the rear of the blade bent upward to form an abutment or stop 11 which serves also as means for attaching the blade to a handle 12 by conventional means such as a bolt or screw 13. At one side edge of the blade and adjacent the base thereof there is provided a spring-loaded lever pivotally mounted intermediate its ends so as to form a dispensing lever 14 of the long arm, while the short arm is curved and bent at right angles to the lever 14 to form a tab 16 by which the lever 14 can be reciprocated.

In Figs. 2 and 3 it should be noted that in the preferred form the dispensing lever 14 is curved concave with respect to the blade thereby conforming substantially to the curvature of the slice of cake or pie. If desired the abutment or stop 11 may also be curved as shown to conform to the curvature of the lever 14. The lever 14 is preferably mounted so that the lower edge 17 thereof is in contact with or close proximity to the upper surface 18 of the blade 10 so that when the lever is reciprocated it will sweep across the surface of the blade. This positioning is important because it provides means for keeping the major surface of the blade clean of cake "icing" which frequently runs down from the rear of the cake slice. Any suitable spring may be used for loading the lever 14, but in the preferred embodiment there is employed a coil spring 20 surrounding a bolt 21 passing loosely through two spaced horizontal tabs 22 of the back stop 11 and two spaced horizontal tabs 23 extending from the lever 14, one end 24 of the spring bearing against the back of the stop 11 and the other end 25 bearing against the thumb tab 16, so that the spring normally maintains the lever 14 against the back stop 11.

In Fig. 4 there is shown another embodiment of a spring loaded blade-sweeping lever. In this embodiment the back stop 11 of the device shown in Fig. 2 is eliminated. The lever 14a is pivotally mounted on the back edge of the blade as in Fig. 2 and the blade is mounted on the handle 12a by means of two extensions 26 which are fastened to the sides of the blade by screws 27. The end of the handle adjacent the blade is formed with a cavity 28 in which is fixed by screw 29 a coiled spring 30 having the other end welded to the back of the curved lever 14a. When the handle 16a is pressed toward the handle 12a the lever 14a will sweep across the blade 10a and thus expand and extend the spring 30. When the pressure on the thumb tab 16a is released the spring 30 will draw the lever 14a back to the normal position shown in Fig. 4.

The invention is capable of various changes in form and structure within the disclosure of the form invention illustrated. The handle 12 and 12a may be fashioned of metal, wood or plastic material. The blade 14 is preferably formed of metal but may be formed of plastic or other rigid material. When the handle 12 or 12a is formed of metal and the blade of metal these parts may be formed integral or they may be welded together without transcending the scope of the invention.

I claim:

In a device for lifting and serving slices of cake, pie and the like, the combination of, a flat slice-lifting blade, a handle on the base of said blade, a lever pivotally mounted at one side of said blade and adjacent the base thereof, the lower edge of said lever being positioned to sweep across the upper surface of said blade, a thumb tab fixed to said lever and extending beyond the pivot point of said lever, and a spring arranged and positioned to maintain said lever normally in a position substantially transverse of said blade.

ALFRED W. DOUX.

REFERENCES CITED

The following references are of record in the file of this patent:

UNITED STATES PATENTS

| Number | Name | Date |
|---|---|---|
| 1,135,906 | Ludwig | Apr. 13, 1915 |

FOREIGN PATENTS

| Number | Country | Date |
|---|---|---|
| 484,482 | Germany | Oct. 18, 1929 |